United States Patent
Leyh

(10) Patent No.: US 9,698,589 B1
(45) Date of Patent: Jul. 4, 2017

(54) DC POWER DISTRIBUTION ARCHITECTURES

(71) Applicant: Google Inc., Mountain View, CA (US)

(72) Inventor: Gregory E. Leyh, Brisbane, CA (US)

(73) Assignee: Google Inc., Mountain View, CA (US)

( * ) Notice: Subject to any disclaimer, the term of this patent is extended or adjusted under 35 U.S.C. 154(b) by 417 days.

(21) Appl. No.: 14/299,433

(22) Filed: Jun. 9, 2014

(51) Int. Cl.
*H02H 7/26* (2006.01)
*H02H 3/087* (2006.01)
*H02J 1/00* (2006.01)

(52) U.S. Cl.
CPC ............... *H02H 3/087* (2013.01); *H02J 1/00* (2013.01)

(58) Field of Classification Search
USPC .......................................................... 361/67
See application file for complete search history.

(56) References Cited

U.S. PATENT DOCUMENTS

| | | | |
|---|---|---|---|
| 2,354,138 A * | 7/1944 | Parsons | H02J 3/04 307/112 |
| 4,323,788 A | 4/1982 | Smith | |
| 6,191,500 B1 | 2/2001 | Toy | |
| 6,301,133 B1 | 10/2001 | Cuadra et al. | |
| 7,051,132 B2 | 5/2006 | Hong | |
| 8,624,433 B2 | 1/2014 | Whitted et al. | |
| 9,007,735 B2 * | 4/2015 | Park | H02H 3/066 361/67 |
| 2008/0103632 A1 * | 5/2008 | Saban | H02K 3/28 700/286 |
| 2009/0196077 A1 * | 8/2009 | Lee | H02J 3/36 363/35 |
| 2012/0243274 A1 | 9/2012 | Feng et al. | |
| 2013/0215543 A1 * | 8/2013 | Hoeven | H02H 3/081 361/63 |
| 2013/0270902 A1 * | 10/2013 | Andersen | H02H 3/08 307/9.1 |
| 2013/0286521 A1 * | 10/2013 | Park | H02H 3/066 361/57 |
| 2014/0055903 A1 | 2/2014 | Juhlin | |
| 2014/0217821 A1 * | 8/2014 | Rozman | H02J 1/14 307/29 |

FOREIGN PATENT DOCUMENTS

| | | |
|---|---|---|
| CN | 103236794 A | 8/2013 |
| WO | WO2014037583 A2 | 3/2014 |
| WO | WO2014026840 A3 | 5/2014 |

OTHER PUBLICATIONS

ABB AS. Onboard DC Grid—The step forward in Power Generation and Propulsion. 2011. [Online] Available at: http://www04.abb.com/global/seitp/seitp202.nsf/0/292d42e87306453dc12579ad0050a457/$file/12_10_OnboardDCGrid_Technical-Information.pdf [Accessed May 15, 2014].

* cited by examiner

Primary Examiner — Ronald W Leja
(74) Attorney, Agent, or Firm — Fish & Richardson P.C.

(57) ABSTRACT

This specification describes direct current (DC) power distribution systems. One of the systems includes a DC power distribution bus that includes a plurality of sector distribution buses. Each sector distribution bus is coupled to a respective sector power source. A plurality of sector isolation switches are coupled between the sector distribution buses and configured to individually isolate each sector distribution bus from the DC power distribution bus. At least one load is coupled to at least two different sector distribution buses of the DC power distribution bus.

16 Claims, 8 Drawing Sheets

DC POWER DISTRIBUTION ARCHITECTURES

BACKGROUND

This specification relates to DC power distribution architectures.

Power distribution systems in some facilities, e.g., data centers, face ever-increasing demands for reliability, efficiency, cost reduction, and power density. For example, a typical power distribution system can be megawatts in size and serve thousands of loads, e.g., servers. In some cases, availability requirements for the power distribution systems are greater than 99.9%. Distribution of power across the facilities may vary widely over time as well, e.g., during building the facilities and after equipment in the facilities upgrades.

SUMMARY

This specification describes a DC power distribution system with an adaptable, modular, and scalable distribution scheme that allows low installation cost, flexibility, and high availability.

In general, one innovative aspect of the subject matter described in this specification can be embodied in systems that each include a plurality of sectors. Each sector includes a sector power source and a sector distribution bus coupled to the sector power source. The sector distribution bus is configured to convey direct current (DC) power from the sector power source to one or more loads coupled to the sector distribution bus. The system also includes a plurality of sector isolation switches coupled between the sector distribution buses. The coupled sector distribution buses provide a DC power distribution bus, and the sector isolation switches are configured to individually isolate each sector distribution bus from the DC power distribution bus. At least one load of the loads is coupled to at least two different sector distribution buses of the plurality of sectors.

In another general embodiment, a DC power distribution system includes a direct current (DC) power distribution bus that includes a plurality of sector distribution buses. Each sector distribution bus is coupled to a respective sector power source. A plurality of sector isolation switches are coupled between the sector distribution buses and configured to individually isolate each sector distribution bus from the DC power distribution bus. At least one load is coupled to at least two different sector distribution buses of the DC power distribution bus.

In a third general embodiment, one innovative aspect of the subject matter described in this specification can be embodied in methods that each includes the actions of monitoring currents across each sector of a plurality of sectors in a DC power distribution system. The DC power distribution system includes a plurality of sector isolation switches. Each sector includes a sector power source and a sector distribution bus coupled to the sector power source. The sector distribution bus is configured to convey DC power from the sector power source to one or more loads coupled to the sector distribution bus. The sector distribution bus is coupled to adjacent sector distribution buses through respective sector isolation switches of the plurality of sector isolation switches. The sector distribution buses are coupled together to provide a DC power distribution bus. The method also includes determining that a fault occurs at a first sector of the plurality of sectors; and in response to determining that the faults occurs at the first sector, opening respective sector isolation switches for the first sector distribution bus to isolate the first sector distribution bus from the DC power distribution bus, so that a particular load of the loads that is coupled to the first sector distribution bus and a second sector distribution bus of a second sector of the sectors draws power from the second sector distribution bus.

The foregoing and other embodiments can each optionally include one or more of the following features, alone or in combination. For instance, for each sector of the plurality of sectors, the sector distribution bus of the sector is coupled to respective first and second sector isolation switches of the sector isolation switches, and the first sector isolation switch is coupled to a first other sector distribution bus of a first other sector and the second sector isolation switch is coupled to a second other sector distribution bus of a second other sector, so that opening both the first and second sector isolation switches isolates the sector distribution bus from the DC power distribution bus. The sector distribution bus of the sector can be coupled to two adjacent sector distribution buses at two ends of the sector distribution bus through the first and second sector isolation switches for the sector distribution bus, and a number of the sector distribution buses may be identical to a number of the sector isolation switches.

The features further include a control system configured to perform operations including: monitoring currents across each sector of the plurality of sectors; determining that a fault occurs at a particular sector; and in response to determining that the faults occurs at the particular sector, opening respective sector isolation switches for a particular sector distribution bus of the particular sector to isolate the particular sector distribution bus from the DC power distribution bus. The fault may include overcurrent, short circuit, or power outage, and determining that the fault occurs includes determining a current in a particular sector is beyond a maximum threshold or below a minimum threshold. In some cases, the features include a control system configured to perform operations including: determining that a fault occurs at a first sector of the sectors; and in response to determining that the fault occurs at the first sector, opening respective section isolation switches for a first sector distribution bus of the first sector to isolate the first sector distribution bus from the DC power distribution bus, so that a particular load of the loads that is coupled to the first sector distribution bus and a second sector distribution bus of a second sector of the sectors draws DC power from the second sector distribution bus. A sector power source of the second sector may include one or more back-up generators, and the operations further includes in response to determining that the fault occurs at the first sector, turning on the one or more back-up generators.

The features further include at least one load of the loads coupled to each of the at least two different sector distribution buses through a set of respective diodes. A breaker can be coupled between the load and the respective diodes for the sector distribution buses. The breaker can be configured to perform operations including: determining that a current to the load is beyond a maximum threshold or below a minimum threshold; and in response to determining that the current to the load is beyond the maximum threshold or below the minimum threshold, isolating the load from the respective diodes and the at least two sector distribution buses. In some examples, a particular sector of the plurality of sectors includes a converter coupled between a particular sector distribution bus of the particular sector and a particular load of the loads. The converter can be configured to convert a higher voltage from the particular sector distribution bus to a lower voltage at an acceptable level for the particular load.

Particular embodiments of the subject matter described in this specification can be implemented to realize one or more advantages. First, the power distribution system can provide low installation cost, flexibility, and high availability. Second, the power distribution system can enable achieving desired nameplate ratings for facilities such as data centers. Third, the power distribution system can allow seamless power combining from multiple power sources, eliminate transition switchgear and synchronization or paralleling requirements for backup generators, and support power peaks above the nameplate ratings. In addition, energy storage, e.g., batteries, can be abstracted to a bus level without expensive alternating current (AC) chopper-converters. Fourth, short-circuit current ratings for the power distribution system can be lower than standard current ratings. Switchgear current ratings can be also considerably lower. Fifth, bus voltage can be agnostic to nameplate ratings, frequency, phase, and/or technology of power sources, so that the power distribution system, e.g., MVDC power distribution system, can be applied worldwide. Sixth, loads can select the strongest available source with zero drop-out. Stranded power in the power distribution system can be alleviated or eliminated. Seventh, the power distribution system can allow simplified rack-level converters with lower voltage and no rectification, power factor or harmonics requirements, and simplified variable-frequency drives (VFDs) for large MV electric motors. Eighth, the power distribution system enables greater copper utilization and lower stresses and fatigue on conductors and insulators due to magnetic forces and partial discharge effects.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
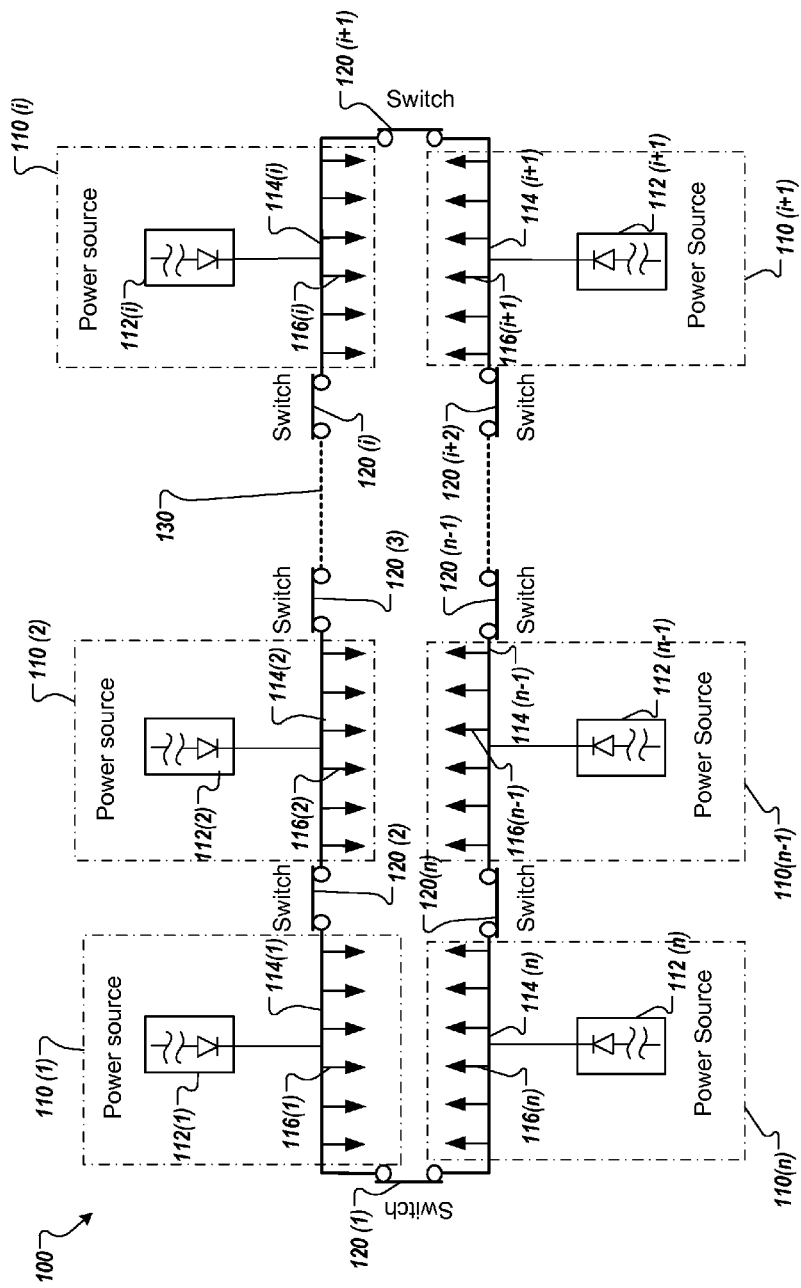
FIG. 1 is a block diagram of an example power distribution system.

FIG. 1 is a block diagram of an example power distribution system 100. The system 100 includes a number of sectors 110(1), 110(2), . . . , to 110($n$), where n is an integer larger than 1 and can be odd or even. In a particular example, the system 100 includes even numbers of sectors that simplify physical layout of a switchgear for the system 100.

Each sector can include a sector power source and a sector distribution bus. For example, sector 110(1) includes sector power source 112(1) and sector distribution bus 114(1). Sector distribution bus 114(1) provides connections 116(1) for connecting to sector power source 114(1) and one or more loads. Sector distribution bus 114(1) can convey power from sector power source 112(1) to the one or more loads coupled to sector distribution bus 114(1).

The system 100 can include a number of sector isolation switches 120(1), 120(2), . . . , 120($n$). The sector isolation switches are coupled to sector distribution buses 114(1), 114(2), . . . ,114($n$) of sectors 110(1), 110(2), . . . ,110($n$) to provide a common power distribution bus 130. The common power distribution bus 130 includes sector isolation switches 120(1), 120(2), . . . , 120($n$) and sector distribution buses 114(1), 114(2), . . . ,114($n$). The common power distribution bus 130 can provide a common power node and convey power from sector power sources 112(1), 112(2), . . . ,112($n$) to the loads coupled to sector distribution buses 114(1), 114(2), . . . ,114($n$).

In some examples, the common power distribution bus 130 can transport power laterally between any sector power source of sector power sources 112(1), 112(2), . . . , 112($n$) and any load coupled to sector distribution buses 114(1), 114(2), . . . ,114($n$). The common power distribution bus 130 may have a common bus voltage for the sectors connected to the common power distribution bus 130.

For each sector in the system 100, the sector distribution bus of the sector can be coupled to respective first and second sector isolation switches, e.g., by connecting the first and second sector isolation switches to two connections of the sector distribution bus, respectively. The first sector isolation switch can be coupled to a first other sector distribution bus of a first other sector and the second sector isolation switch can be coupled to a second other sector distribution bus of a second other sector, so that opening both the first and second sector isolation switches can isolate the sector distribution bus from the first and second other sector distribution buses and the common power distribution bus, which, correspondingly, isolates the sector from the first and second sectors and the other sectors in the system.

In a particular example, sector distribution bus 114(1) of sector 110(1) is coupled to sector isolation switches 120(1) and 120(2). Sector isolation switch 120(1) is coupled to sector distribution bus 114($n$) of sector 110($n$), and sector isolation switch 120(2) is coupled to sector distribution bus 114(2) of sector 110(2). When both sector isolation switches 120(1) and 120(2) are opened, sector distribution bus 114(1) is isolated from sector distribution buses 114(2) and 110($n$) and the common power distribution bus 130, which also isolates sector 110(1) from sectors 110(2) and 110($n$) and the other sectors, e.g., sectors 110($i$) and 110($i$+1), in the system 100.

In some implementations, for each sector, the connections of the sector distribution bus are separately distributed along a line, a curve, or a ring. The sector power source of the sector is connected to a connection in a middle point of the sector distribution bus. Power, e.g., current, from the sector power source can be laterally distributed to two sides of the sector distribution bus from the middle point. The first and second sector isolation switches for the sector distribution bus can be connected to two connections at left and right ends of the sector distribution bus, respectively.

As described in further detail below, one or more backup generators can be connected to one or more connections of the sector distribution bus that are between the left or right end and the middle point. In a particular example, a first backup generator is coupled at a quarter point from the left end, and a second backup generator is coupled to a quarter point from the right end.

In some examples, the sector distribution bus is coupled to two adjacent sector distribution buses through the first and second sector isolation switches. For example, a starting sector 110(1) is connected to sector 110(2) with sector isolation switch 120(2), and sector 110(i) is connected to sector 110(i+1) with sector isolation switch 120(i+1). In a particular example, an ending sector 110(n) is connected to the starting sector 110(1) with sector isolation switch 120(1). In this case, the sector distribution buses of the sectors are connected together to form a loop bus or a ring bus, e.g., the common power distribution bus 130 in FIG. 1. The total number of sectors, n, is equal to the total number of sector isolation switches.

In a particular example, some sector distribution buses and/or sectors are positioned opposite to each other. For example, as illustrated in FIG. 1, sector distribution bus 114(1) is opposite to sector distribution bus 114(n). Sector distribution bus 114(2) is opposite to sector distribution bus 114(n-1). In some examples, the common power distribution bus 130 is open, and the number of the sectors is larger or smaller than the number of the sector isolation switches.

A sector in the system 100 can be isolated from the system 100, e.g., so that maintenance can be performed on components of the sector, or for removing the sector from the system 100. The sector can be isolated by opening first and second sector isolation switches for the sector. The first sector isolation switch may be coupled to the sector and a first other sector, and the second sector isolation switch may be coupled to the sector and a second other sector.

In some examples, after the sector is isolated and removed from the system 100, the first other sector and the second other sector can be coupled together by a sector isolation switch, e.g., the first sector isolation switch, the second sector isolation switch, or a new sector isolation switch. For example, sector 110(1) can be isolated and/or removed from the system 100 by opening sector isolation switches 120(1) and 120(2). Sector 110(2) and sector 110(n) can then be connected with sector isolation switch 120(1), 120(2), or a new sector isolation switch. In some examples, one or more sectors in the system 100 can be removed from the system 100.

A new sector can be added into the system 100 at a desired location. For example, the new sector can be added between sector 110(1) and sector 110(2) by opening sector isolation switch 120(2), connecting the new sector, e.g., a connection at a left end of the sector distribution bus of the new sector, to sector 110(1) with a sector isolation switch, e.g., switch 120(2), and connecting the new sector, e.g., a connection at a right end of the sector distribution bus of the new sector, to sector 110(2) with a new sector isolation switch. In some examples, one or more new sectors can be added to the system 100 at one or more desired locations.

In some implementations, the number of sectors 110(1), 110(2), ..., 110(n) in the system 100 are identical. The number of switches 120(1), 120(2), ...,120(n) in the system 100 can be also identical. One or more new sectors identical to sectors 110(1), 110(2), ..., or 110(n) can be added into the system 100 to increase a nameplate rating for the system 100. Any desired number of sectors can be added into the system 100 to achieve a desired nameplate rating.

In a particular example, at least one extra sector is added to the system 100 for redundancy so that a total power of the system 100 can be beyond the nameplate rating. In some examples, the number of the sectors n is an even number and the system 100 provides a uniform layout. For each sector, the sector distribution bus can provide connections for at least one sector power source, two sector isolation switches, and a number of loads.

The system 100 can include a control system. The control system can be configured to detect a fault, e.g., overcurrent, short circuit, or power outage. The control system can monitor currents flowing across the common power distribution bus 130, e.g., each sector distribution bus 114(1), 114(2), ... ,114(n) and each sector isolation switch 120(1), 120(2), ... 120(n). In a particular example, and as described in further detail in FIGS. 4A-4D, the control system detects individual currents flowing across each sector distribution bus, e.g., a first current flowing towards a left side of the sector distribution bus and a second current flowing towards a right side of the sector distribution bus. The control system can determine the fault, e.g., a current across a particular sector beyond a maximum threshold or below a minimum threshold. The maximum and minimum thresholds can be predetermined. In response to determining that the fault, the control system can control to open first and second sector isolation switches for a sector distribution bus of the particular sector to isolate the sector distribution bus from the common power distribution bus 130 or the particular sector from the other sectors.

In some implementations, each sector isolation switch includes a sensing system for sensing a fault, e.g., a major bus fault. In some examples, the sector isolation switch includes a circuit breaker and/or a sectionalizer. In response to sensing the fault, the sector isolation switch can automatically open to disconnect a sector distribution bus from a common power distribution bus. The sector isolation switch can automatically or manually be closed to reconnect the sector distribution bus to the common power distribution bus after the fault is clear.

The sector isolation switch can be rackable and have viewable disconnections for planned maintenance. The sector isolation switch may have low voltage compartment including protection and control devices, and/or high speed circuit breaker compartment, and/or rear high voltage busbar compartment including optional disconnecting switch. In a particular example, the sector isolation switch has a rated operational voltage up to 3600 VDC, and/or a rated current busbar of about 2000 A to 9000 A, and/or a rated output current of about 4000 A.

In some implementations, at least one sector power source of the number of sectors includes a DC power source for providing DC power. The common power distribution bus 130 of the system 100 can be a DC power distribution bus. In some examples, the DC power source is a low voltage DC (LVDC) source and provides a DC voltage of about 120 V to 1000 V. In some examples, the DC power source is a medium voltage DC (MVDC) source and provides a DC voltage of about 1 kV to 72 kV. In some other implementations, at least one sector power source includes an AC power source for providing an AC power. The AC power source may be a medium voltage AC source.

In some implementations, each sector power source in the system 100, e.g., sector power source 112(1), 112(2), ..., and 112(n), includes a DC power source. DC voltages at the DC power distribution bus 130 can be agnostic to a total nameplate rating due to distributed nature of the DC power sources. DC power can be injected into the DC power distribution bus 130 at regular intervals. Bus current that flows between sectors acts to correct imbalances in power density across the system 100. A capacity of the DC power distribution bus 130 can be configured to cover the power imbalance for the system 100.

In some cases, a large amount of power capacity can be stranded at a location of a facility, e.g., a data center. The DC power distribution bus 130 provided in the system 100 can alleviate or eliminate the stranded DC power by allowing unused power capacity in one sector to be transported across multiple sectors in either direction with minimal loss.

Figure 2:
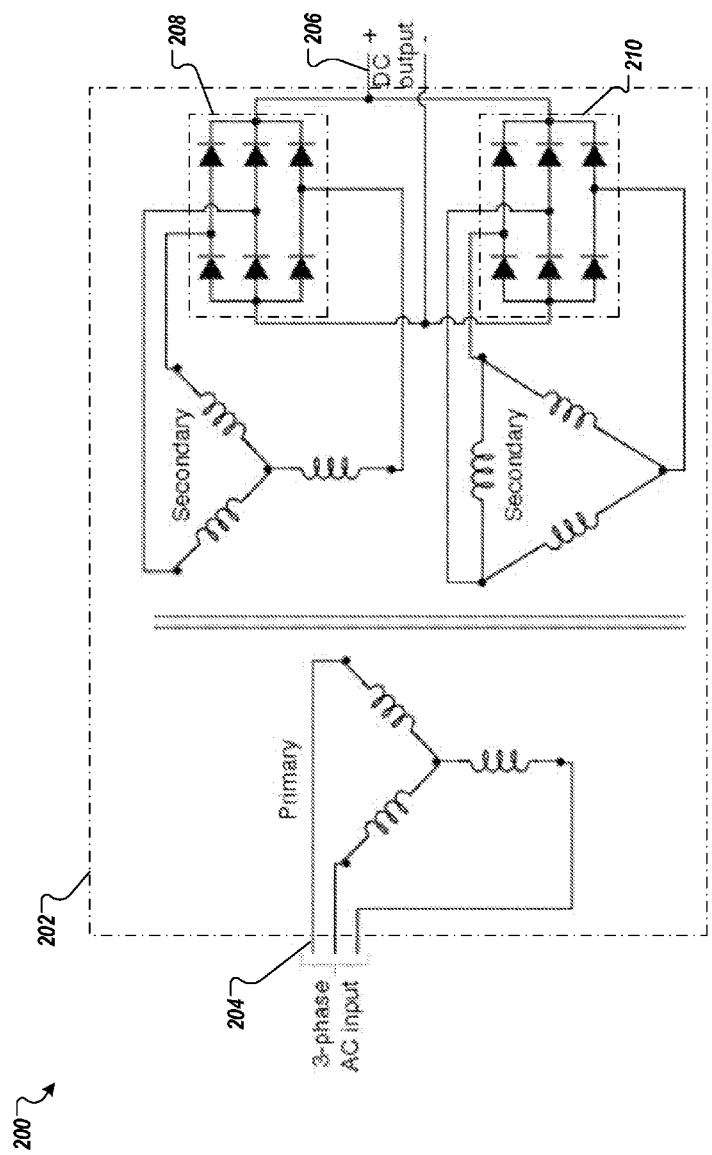
FIG. 2 is a block diagram of an example power generation set for a power source in the power distribution system of FIG. 1.

A DC power source, e.g., the power source 112(i) in the system 100, can include connections to a utility grid and a sector distribution bus, e.g., the sector distribution bus 114(i), a power generation set, and/or one or more backup generators. FIG. 2 illustrates an example power generation set 200 for a DC power source in the system 100. The power generation set 200 includes a transformer-rectifier set 202.

The transformer-rectifier set 202 can convert input AC power from a utility grid at an input connection 204 to DC power for a sector distribution bus at an output connection 206. The input AC power can be 3-phase AC input. In some examples, the transformer-rectifier set 202 can be designed to operate directly from high voltage (HV) utility feeds, e.g., as high as 220 kV. The output of the transformer-rectifier set 202 can connect in parallel to a same catenary bus, together with other outputs of transform-rectifier sets. The outputs of the transform-rectifier sets can be isolated by a catenary impedance between them.

The transformer-rectifier set 202 can feature a wye and a delta secondary to allow rectification, e.g., 12-pulse rectification. In some examples, the transformer rectifier set 202 can be configured for 24-pulse or higher rectification to reduce power line disturbances at the AC input 204. The transformer-rectifier set 202 can be passive unregulated types or use actively controlled thyristor-rectifiers to provide voltage regulation, current limiting, and/or power factor correction. In some examples, the transformer-rectifier set 202 is specified to provide active current limiting and voltage regulation.

The transformer-rectifier set 202 can include a first diode set 208 coupled to a first secondary transformer and a connection to provide a positive DC output and a second diode set 210 coupled to a second secondary transformer and a connection to provide a negative DC output. The first and second diode sets 208 and 210 can be passive diode sets and configured to level DC power from the sector power sources to the loads, e.g., naturally and automatically. In a particular example, a 5 MVA transformer-thyristor rectifier set occupies a footprint of about 10'×20'. The transformer-rectifier set 202 can be pad-mounted, e.g., outdoors or close to the DC power distribution bus.

As discussed in further detail below with reference to FIGS. 4C and 4D, at least one sector power source of the power distribution system 100 can include one or more backup generators local to the sector power source. In some examples, the sector power source includes a DC power source having a transformer-rectifier set. The one or more backup generators can provide a total DC power substantially identical to a DC power provided by the transformer-rectifier set.

The backup generators can be diesel generation sets. Each backup generator can have its own rectifier bank for connection to a sector distribution bus and/or the DC power distribution bus of the system 100, which allows each backup generator to supply the DC power distribution bus independently, e.g., regardless of status of a utility grid for the transformer-rectifier set or of other backup generators. Each backup generator can be configured to spin fast enough to deliver DC power to the DC power distribution bus.

In some examples, an alternator of the backup generator can be specified to operate at a voltage for the DC power distribution bus directly or through a matching transformer. The backup generator can be designed to have a size and a voltage callout for a nameplate rating of the DC power distribution bus and/or the system.

In some cases, the backup generators can temporarily boost the nameplate rating of a facility, e.g., a data center, when needed. At the DC power distribution bus, the outputs of the transformer-rectifier set can combine power from the backup generators and utility power without transition events or power backflow to the utility grid. In some cases, the backup generators can allow operation above nameplate ratings during peak situations, e.g., without power-capping and/or within an available thermal capacity. In some examples, the backup generators are operated in a constant power mode that the output power is regulated and the output voltage and current are limited. The backup generators may include gated thryristor rectifiers and can regulate output power and place limits on the output voltage and current.

The sector power source can be selected based on factors including commercial availability of components, expected minimum size of a DC distribution bus, and/or sizes for commercial backup generators. A transformer-rectifier set in the DC power source can be configured to be large enough to match up with backup generators and small enough that a redundant DC power source represents a fraction of a total nameplate rating for a power distribution system, e.g., the system 100 of FIG. 1.

In some examples, the transformer-rectifier set can provide power identical to a total power provided by one or two backup generators. In a particular example, the transform-rectifier set has a size of 5 MVA, and the backup generators include two generators with a size of 2.5 MVA. The DC power sources can be adjusted upon an assessment of cost, equipment preferences and facility requirements.

Figure 3:
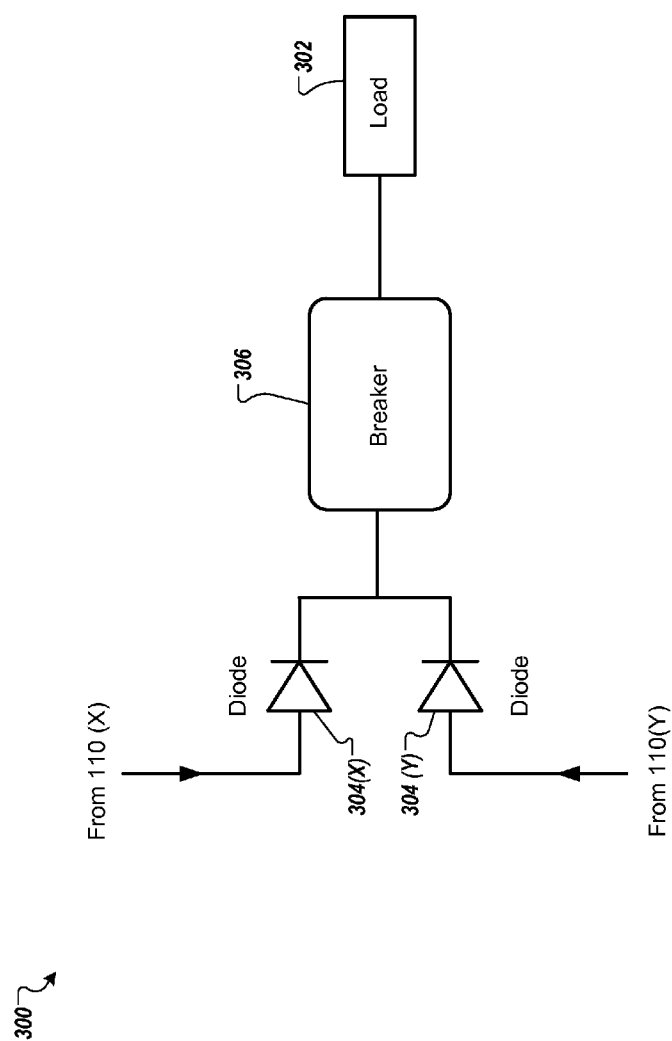
FIG. 3 is a block diagram of an example load operating system in the power distribution system of FIG. 1.

FIG. 3 is a block diagram of an example load operating system 300 in the power distribution system 100 of FIG. 1. A load 302 can be coupled to respective sector distribution buses of at least two sectors, e.g., sectors 110(X) and 110(Y), in the system 100. X and Y are integers. In some examples, sectors 110(X) and 110(Y) are opposing sectors positioned in the system 100. Sectors 110(X) and 110(Y) can provide a dual-cording capacity for the load 302 so that the load can be operated without interruption in an event that one of sectors 110(X) and 110(Y) drops out of service or meets a fault.

In some implementations, the load 302 is coupled to each of the different sector distribution buses through a respective diode. For example, the load 302 is coupled to the sector distribution bus of sector 110(X) through a first diode 304(X) and to the sector distribution bus of sector 110(Y) through a second diode 304(Y).

The first and second diodes 304(X) and 304(Y) can be gating diodes that are configured to draw, e.g., naturally and automatically, from the strongest power source of the sector power sources of sectors 110(X) and 110(Y) and isolate the sector power sources from each other. In some examples, the first and second diodes 304(X) and 304(Y) are a pair of gating diodes, particularly, medium voltage gating diodes. In a particular example, the pair of gating diodes has a voltage rating of about 3600 V and a current rating of about 160 A.

In some implementations, the load operating system 300 includes a breaker 306 coupled between the load 302 and the respective diodes 304(X) and 304(Y) for sectors 110(X) and 110(Y). The breaker 306 can be configured to determine a fault, e.g., overcurrent or short circuit, and then open to disconnect or isolate the load 302 from the respective diodes 304(X) and 304(Y) and sectors 110(X) and 110(Y). In some implementations, the first and second diodes 304(X) and 304(Y) can be integral to the breaker 306.

The load 302 can have a current rating lower than a current rating of the common power distribution bus of the system, e.g., the common power distribution bus 130 of FIG. 1. In some examples, the breaker 306 is a medium voltage (MV) breaker, particularly, a MV solid state breaker. The MV breaker can be a MVDC breaker or a MVAC breaker. The breaker 306 can be configured to handle lower load current and offer a short circuit current rating (SCCR) above short circuit current (SCC) capacity of the MV power distribution bus.

The breaker 306 may have a compact and cost-effective design. The fast breaker can be designed for 30 A loads at 3.3 kV peak input voltage. In some implementations, the load operating system 300 is configured to turn off or isolate the load 302 when a bus voltage at the sector distribution bus drops below a minimum value, e.g., 2 kV and/or exceeds a maximum value, e.g., 3 kV.

In some implementations, at least one sector in the power distribution system 100 includes a converter coupled between a sector distribution bus of the sector and a load coupled to the sector distribution bus. The converter can be configured to convert a higher voltage from the sector distribution bus to a lower voltage at an acceptable level for the load.

In some examples, the load may be rated for about 240 VAC mains input and the voltage at the sector distribution bus is about 2400 VDC. The converter can convert the 2400 VDC voltage directly to 240 VAC voltage for the load. In some examples, the load may be rated for 360 VDC. The converter can be configured to down convert the 2400 VDC voltage to 360 VDC voltage for the load.

The power distribution system 100 may include a control system. The control system can identify that a particular load is coupled to a first sector distribution bus of a first sector, e.g., sector 110(X), and a second sector distribution bus of a second sector, e.g., sector 110(Y). The control system can determine a fault and then open first and second section isolation switches for the first sector distribution bus to isolate the first sector distribution bus from the DC power distribution bus, so that the particular load draws the DC power from a sector power source of the second sector through the second sector distribution bus. In some example, the control system can turn on one or more backup generators in the second sector before or after isolating the first sector distribution bus.

FIGS. 4A-4D depict an example power distribution system 400 operating at different conditions. The system 400 can be the power distribution system 100 of FIG. 1 with n equal to 6. The system 400 includes six identical sectors 110(1), 110(2), 110(3), 110(4), 110(5), and 110(6). The sectors are connected by six sector isolation switches 120(1), 120(2), 120(3), 120(4), 120(5), and 120(6) to form a DC power distribution bus 130. The DC power distribution bus 130 is a ring bus.

Each load is coupled to two opposite sectors through respective diodes and/or a breaker and/or a converter. For example, the load 302 is coupled to sector 110(3) through diode 304(3) and sector 110(4) through diode 304(4). Sector 110(3) is opposite to sector 110(4).

A voltage at the ring bus 130 can be chosen based on factors including motivations for higher voltage, e.g., lower busbar/switchgear currents, lower rack feeder cable currents, lower short-circuit fault ratings, lower input current rating for SSTs, and motivations for lower voltage, e.g., greater selection of solid-state switching devices.

The system 400 is designed to provide a DC power distribution ring bus with a nameplate rating of 25 MW. The voltage at the ring bus 130 is configured to be 2.4 kV DC. The current rating for the ring bus 130 is about 2000 A DC or 1800 A RMS AC. The maximum power for each sector is about 5 MW, with a maximum current 2100 A at 2.4 kV DC. Five of the six sectors provide a total power of 25 MW and one extra sector is provided in the system 400 for redundancy. An SCCR for the total six sector distribution buses is 12.6 kA. Each sector includes two backup generator with a power size of 2.5 MW.

Each sector can feed a number of loads, e.g., 72 loads with a size of 60 kW. The loads can be operated in a constant power mode. If an input voltage for the load drops, a current drawing from one of the coupled sectors will increase to maintain the constant power. The DC power distribution ring bus 130 can compensate for unbalanced power densities. Current densities can indicate how power is shared between sectors of the system 400. Higher power imbalances can be supported by increasing ampacity of the ring bus 130.

Figure 4A:
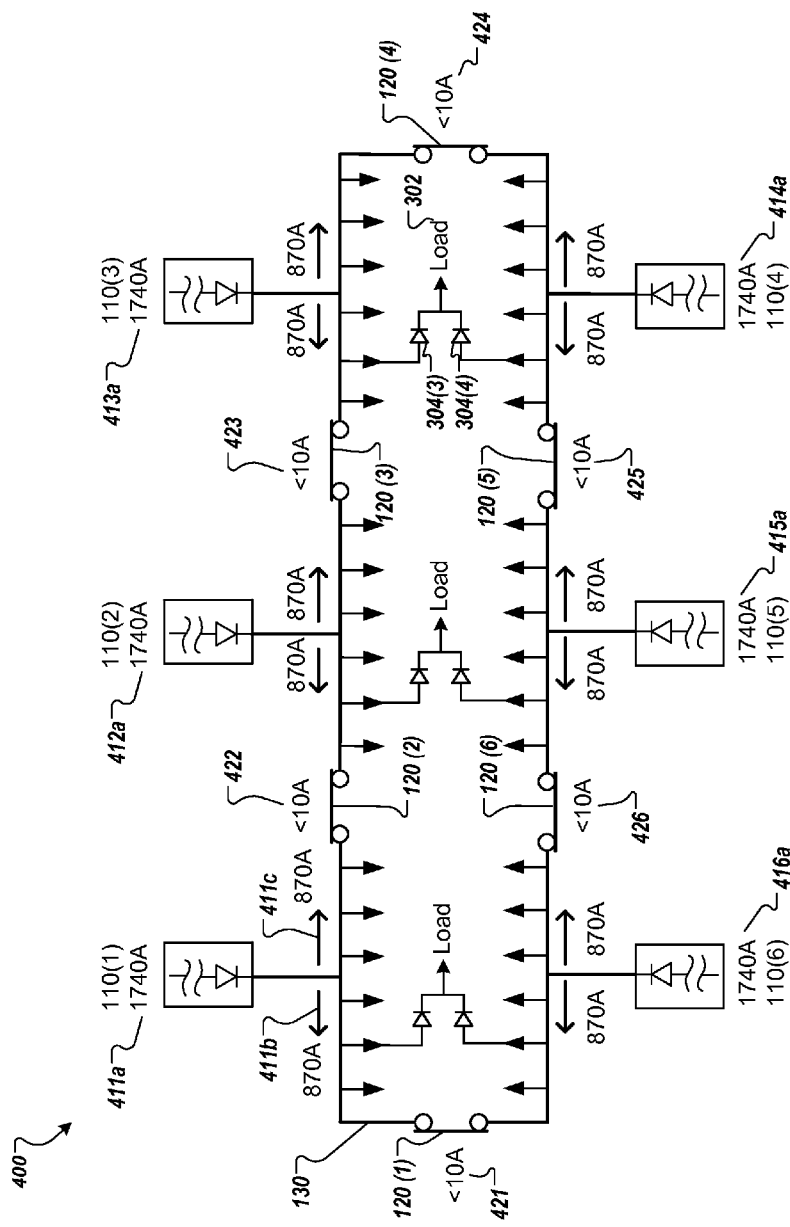
FIGS. 4A-4D depict an example power distribution system operating at different conditions.

FIG. 4A depicts operation of the system 400 at a full nameplate, with the loads equal across the system 400. In this case, all of the DC power supply currents 411a, 412a, 413a, 414a, 415a, 416a are equal to 1740 A, which represents 4176 kW power being drawn from each of the six 5 MW power sources at 2400 VDC bus voltage. For each sector, power, e.g., the current 411a with a size of 1740 A, from the DC power source is equally distributed to two sides of the sector distribution bus, e.g., currents 411b and 411c with a size of 870 A. Currents 421, 422, 423, 424, 425, and 426 flowing between the sectors are almost zero, e.g., <10 A, as the loads are balanced and all sectors are operational.

Figure 4B:
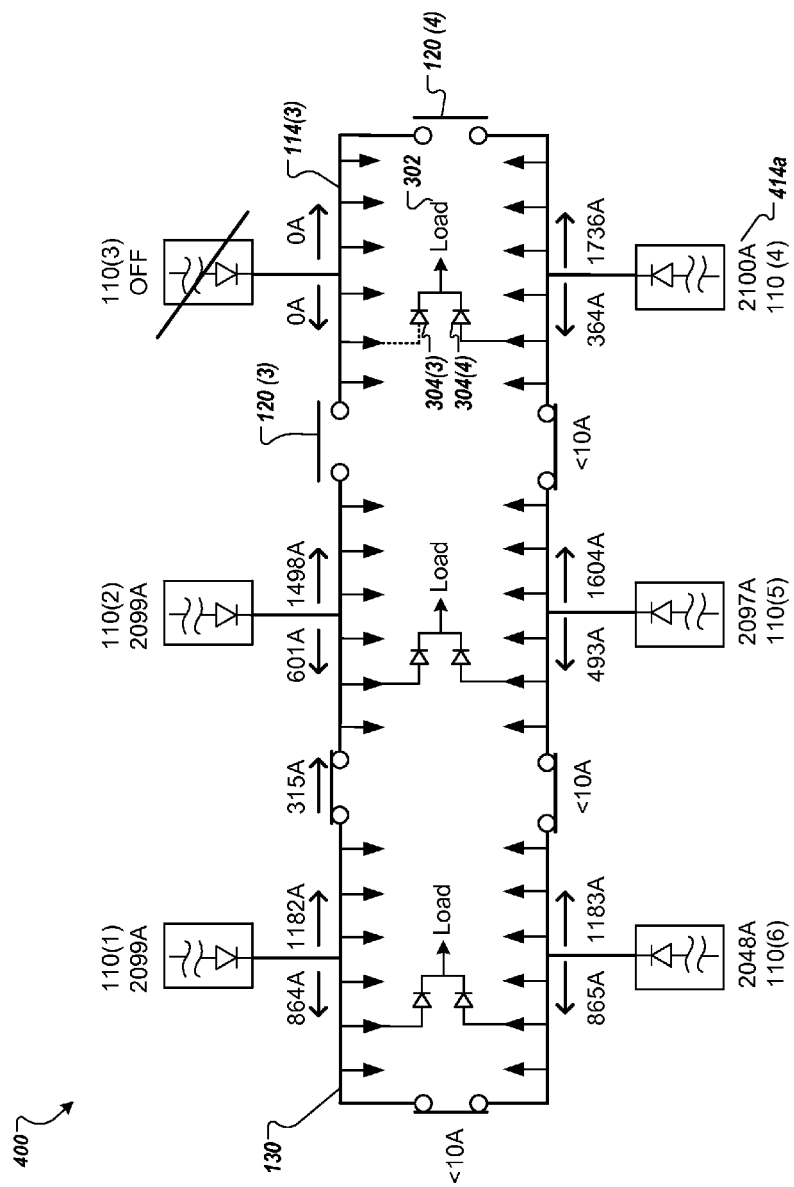

FIG. 4B depicts operation of the system 400 with one inactive sector. For example, the DC power source of sector 110(3) is de-energized, e.g., due to a fail of the DC power source. In response to the failure, two adjoining sector isolation switches 120(3) and 120(4) are opened, isolating sector distribution bus 114(3) from the ring bus 130 and thus sector 110(3) from the other sectors. When sectors 110(3) and 110(4) are both in the system 400, the load 302 draws power from sectors 110(3) and 110(4).

When sector 110(3) is isolated from the system 400, the load 302 continues to draw power from sector 110(4) without interrupt. In this case, loads on sector 110(4) increase. Additional power can flow into sector 110(4) laterally from across the ring bus 130 through adjoining sector 110(5). Sector 110(2) also brings in shared power by taking over load from sector 110(5). Power sharing and proportioning action are not determined by any type of active control, and power balancing is driven by voltage drops in bus conductors and natural tendency for gating diodes coupled between the sector distribution buses and the loads to select the strongest voltage source.

As illustrated in FIG. 4B, all of the operational DC power sources across the system 400 are running at near full capacity, e.g., 2100 A. A highest bus current is on right-side sector 110(4), at 1736 A. The right-side of sector 110(2) is relatively high at 1498 A, as the bus voltage in sector 110(5) drops for the loads coupled to both sectors 110(2) and 110(5) to begin favoring sector 110(2).

Figure 4C:
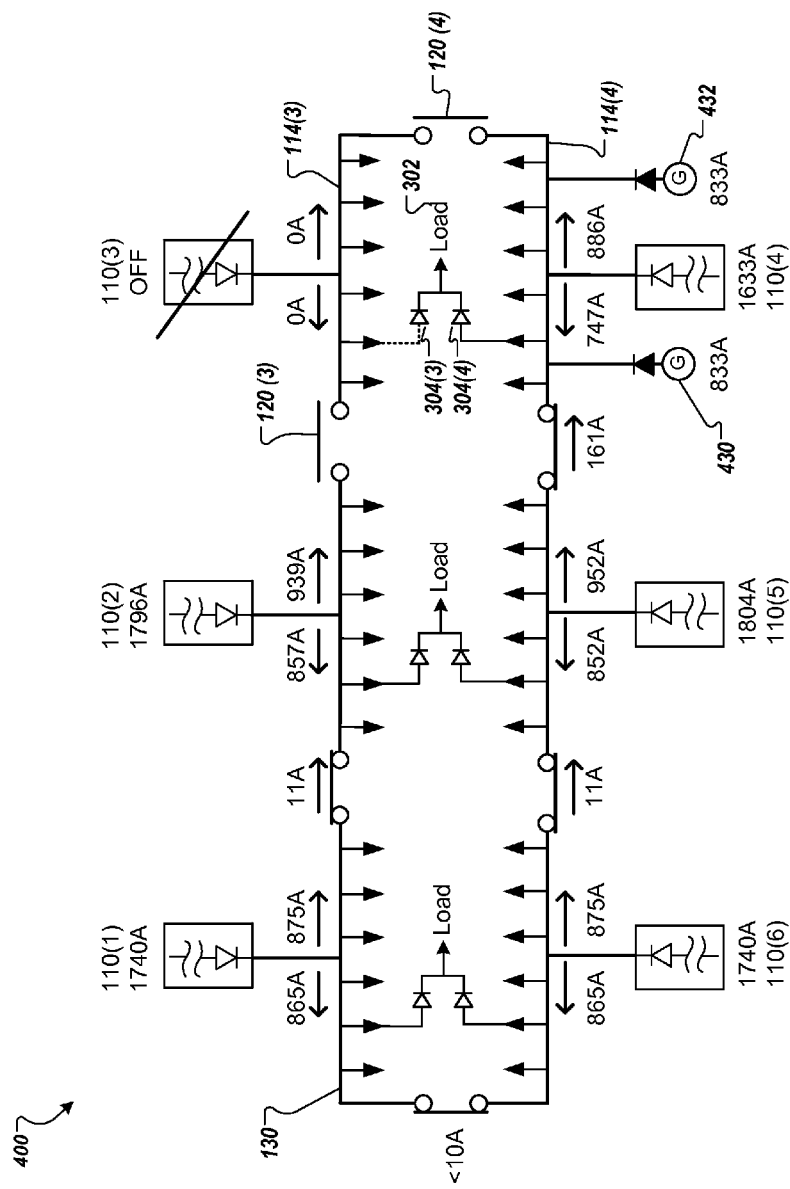

FIG. 4C depicts operation of the system 400 with one inactive sector 110(3) plus two backup generators 430 and 432. One or more backup generators can be turned on in response to isolating a sector from the system. The two backup generators 430 and 432 can deliver about 2 MW, e.g., a current 833 A, each into the ring bus 130. In some examples, adding the two backup generators in sector 110(4) can bring the system 400 back to a nearly normal operating margin. In some examples, the backup generators 430 and 432 can connect at 25% and 75% points in the sector distribution bus 114(4) to optimize current distribution.

Due to contributions from the backup generators 430 and 432, adjoining sectors 110(2) and 110(5) may have a modest increase in power draw. For the farther sectors 110(1) and 110(6), DC currents across the ring bus 130 are substantially unchanged. Power can flow in one direction through transformer-rectifiers in the power sources of the system 400, and utility coordination or transitions may be not required when adding the backup generators 430 and 432 to the ring bus 130.

Figure 4D:
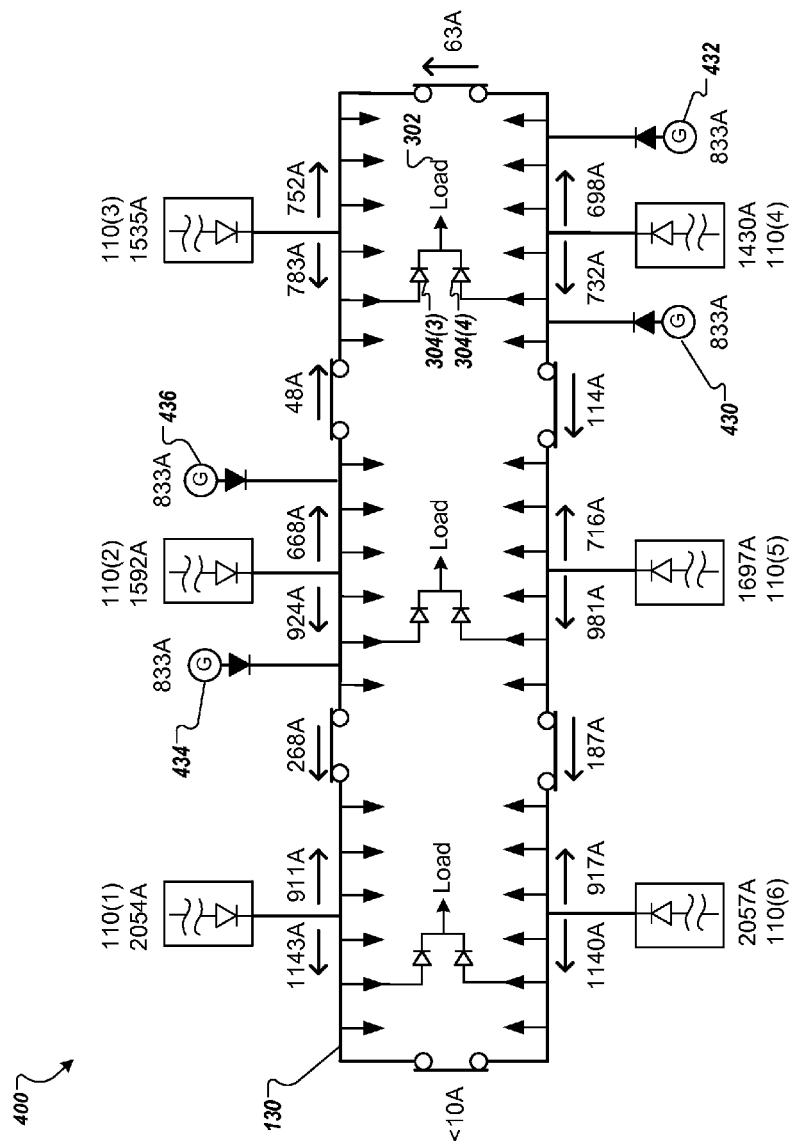

FIG. 4D depicts operation of the system 400 above the nameplate rating. In some cases, the system 400 is desirable to operate above the nameplate rating for short durations, as thermal capacity permits. For example, the system 400 with a 25 MW ring bus operates at 8 MW above the nameplate rating.

Extra power can be provided by a selected number of backup generators in the system 400. For example, backup generators 430, 432, 434, 436 at sector 110(2) and 110(4) are turned on to provide the extra power. Each of the four backup generators contributes about 2 MW to the ring bus 130, allowing the transformer-rectifiers of the sectors to run at near normal reserve capacity to cover any sector outage. The forward power for each backup generators can be regulated by adjusting firing angle of its thyristor rectifiers.

In some cases, increasing the output power of the backup generators can proportionally reduce power draw from the nearby transformer-rectifiers. Any number of backup generators can be brought to the ring bus 130 in any sequence, without paralleling gear or synchronization.

In some implementations, the system 400 includes a control system to optimize which backup generators are chosen to give optimal current distribution across the ring bus 130. In some examples, as illustrated in FIG. 4D, some backup generators are placed to explore sensitivity to locations of the backup generators. For example, choosing backup generators at sectors 110(2) and 110(5) gives better current distribution than choosing the backup generators at sectors 110(2) and 110(4). In some cases, a highest bus current, e.g., 1143 A, occurs on the left-side bus in sector 110(A), the furthest point on the ring bus away from the turned-on backup generators.

When maintenance or repair is required on the DC power distribution bus 130, an affected sector, e.g., sector 110(3), can be de-energized and grounded without affecting critical loads. Steps can include: opening first and second sector isolation switches 120(3) and 120(4) at both ends of sector 110(3), ramping down the transformer-rectifier output for sector 110(3). Gating diodes connected to sector 110(3) may naturally commutate power draw to sector 110(4), and the system can operate as illustrated in FIG. 4B. The sector isolation switches can be racked out and bus grounding switches can be applied.

In some cases, the total power is near maximum, and the system 400 can turn on particular backup generators to increase operating margin during the shutdown of sector 110(3). For example, the system 400 can start backup generators at opposing sector 110(4). The backup generators of sector 110(4) can be ramped up to provide a total output power substantially identical to a power level of sector 110(3). Then the system can control to open sector isolation switches 120(3) and 120(4) at both ends of sector 110(3), ramp down the transformer-rectifier output for sector 110(3).

The diodes connected to sector 110(3) may naturally commutate power draw to sector 110(4), and the system can operate as illustrated in FIG. 4C. Sector isolation switches 120(3) and 120(4) can be racked out and bus grounding switches can be applied. In some cases, for planned outages of utility grid or grid connections, backup generators can be brought online one at a time and ramped up until power drawn from the affected grid connections falls to zero. At this point the grid connections can be opened without disrupting the ring bus power.

Figure 5:
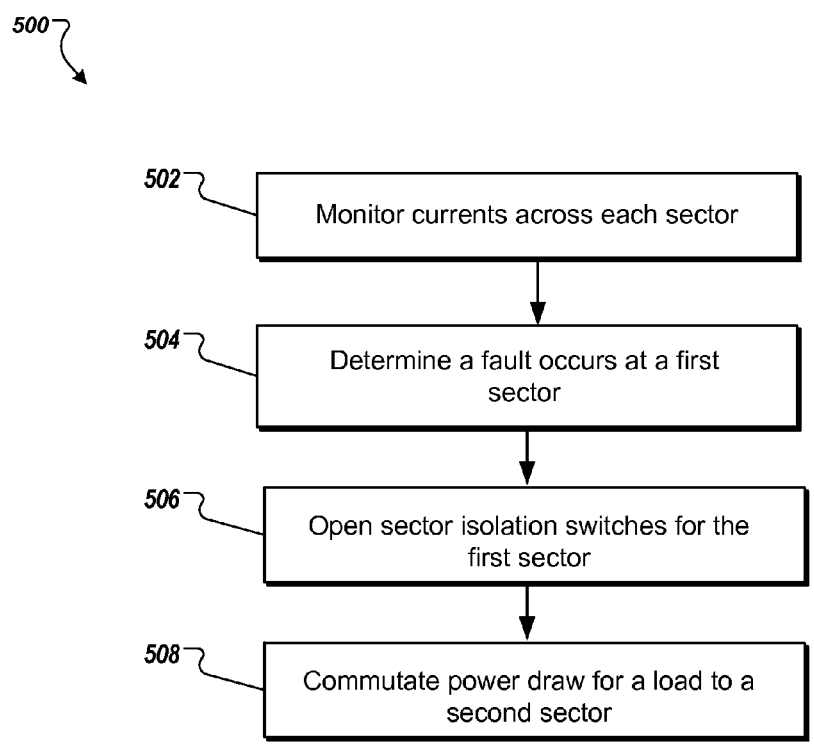
FIG. 5 is a flow chart of an example process performed by the power distribution system of FIG. 1.

FIG. 5 is a flow chart of an example process performed by a power distribution system, e.g., the power distribution system 100 of FIG. 1. The power distribution system includes a number of sectors and a number of sector isolation switches.

Each of the sectors includes a sector power source and a sector distribution bus coupled to the sector power source. The sector distribution bus is configured to convey direct power, e.g., DC power, from the sector power source to one or more loads coupled to the sector distribution bus. The sector distribution bus is coupled to adjacent sector distribution buses through respective first and second sector isolation switches of the sector isolation switches.

The sector distribution buses of the sectors are coupled together to provide a DC power distribution bus. The DC power distribution bus conveys power from the sector power sources to the loads coupled to the sector distribution buses. At least one load of the loads is coupled to at least two different sector distribution buses of the DC power distribution bus.

The power distribution system monitors currents across each sector (502). The power distribution system may include a control system to monitor current across the DC power distribution bus, each sector distribution bus, and/or each sector isolation switch.

The power distribution system determines that a fault occurs at a first sector of the sectors (504). In some examples, the fault may be overcurrent or short circuit at the first sector. The power distribution system detects that a current across the first sector is beyond a maximum threshold and determines the fault occurs for the first sector. The maximum threshold is predetermined. In some examples, the fault may be power outage. The power distribution system detects a current across the first sector drops below a minimum threshold and determines the fault occurs for the first sector. The minimum threshold may be predetermined.

The power distribution system opens first and second sector isolation switches for the first sector (506). In response to determining that the faults occurs at the first sector, the power distribution system can open the sector isolation switches for the first sector distribution bus to isolate the first sector from the DC power distribution bus.

A particular load may be coupled to a first distribution bus of the first sector and a second distribution bus of the second sector. In some implementations, respective diodes are coupled between the particular load and the first and second sector distribution buses. A breaker may be coupled between the particular load and the respective diodes. When the power distribution system isolates the first sector from the DC power distribution bus, the diodes may, e.g., naturally, commutate power draw for the particular load to the second sector distribution bus (508).

In some implementations, the sector power source of the second sector includes one or more back-up generators. The one or more back-up generators may provide a total power substantially identical to power provided by the second sector power source. The power distribution system can turn on the one or more back-up generators, before or after isolating the first sector distribution bus from the DC power distribution bus.

Embodiments of the subject matter and the functional operations described in this specification, e.g., the functional operations performed by one or more control systems, can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A system comprising:
 a plurality of sectors, each sector comprising:
  a sector power source; and
  a sector distribution bus coupled to the sector power source, the sector distribution bus being configured to convey direct current (DC) power from the sector power source to one or more loads coupled to the sector distribution bus;
 a plurality of sector isolation switches coupled between the sector distribution buses and coupling the sector distribution buses, the coupled sector distribution buses providing a DC power distribution bus, the sector isolation switches being configured to individually isolate each sector distribution bus from the DC power distribution bus;
 wherein the sector power source for each sector uniquely corresponds to the sector distribution bus to which it is coupled and is not connected to the sector distribution bus thorough the sector isolation switches; and
 wherein:
  at least one load of the loads is coupled to at least two different sector distribution buses of the plurality of sectors;
  for each sector of the plurality of sectors, the sector distribution bus of the sector is coupled to respective first and second sector isolation switches of the sector isolation switches,
  the first sector isolation switch is coupled to a first other sector distribution bus of a first other sector and the second sector isolation switch is coupled to a second other sector distribution bus of a second other sector, so that opening both the first and second sector isolation switches isolates the sector distribution bus from the DC power distribution bus; and
  the sector distribution bus of the sector is coupled to two adjacent sector distribution buses at two ends of the sector distribution bus through the first and second sector isolation switches for the sector distribution bus; and a number of the sector distribution buses is identical to a number of the sector isolation switches.

2. The system of claim 1, further comprising a control system configured to perform operations comprising:
 monitoring currents across each sector of the plurality of sectors;
 determining that a fault occurs at a particular sector; and
 in response to determining that the faults occurs at the particular sector, opening respective sector isolation switches for a particular sector distribution bus of the particular sector to isolate the particular sector distribution bus from the DC power distribution bus.

3. The system of claim 2, wherein the fault includes overcurrent, short circuit, or power outage, and determining that the fault occurs comprises determining a current in a particular sector is beyond a maximum threshold or below a minimum threshold.

4. The system of claim 1, wherein at least one sector power source of the plurality of sectors is coupled to a utility grid, and the at least one sector power source further comprises one or more backup generators for providing a total DC power substantially identical to a DC power provided by the at least one sector power source.

5. The system of claim 1, further comprising a control system configured to perform operations comprising:
 determining that a fault occurs at a first sector of the sectors; and
 in response to determining that the fault occurs at the first sector, opening respective section isolation switches for a first sector distribution bus of the first sector to isolate the first sector distribution bus from the DC power distribution bus, so that a particular load of the loads that is coupled to the first sector distribution bus and a second sector distribution bus of a second sector of the sectors draws DC power from the second sector distribution bus.

6. The system of claim 5, wherein a sector power source of the second sector comprises one or more back-up generators, and the operations further comprise: in response to determining that the fault occurs at the first sector, turning on the one or more back-up generators.

7. The system of claim 1, wherein the at least one load of the loads is coupled to each of the at least two different sector distribution buses through a set of respective diodes.

8. The system of claim 7, further comprising a breaker coupled between the load and the respective diodes for the sector distribution buses, the breaker being configured to perform operations comprising:
 determining that a current to the load is beyond a maximum threshold or below a minimum threshold; and
 in response to determining that the current to the load is beyond the maximum threshold or below the minimum threshold, isolating the load from the respective diodes and the at least two sector distribution buses.

9. The system of claim 1, wherein a particular sector of the plurality of sectors further comprises a converter coupled between a particular sector distribution bus of the particular sector and a particular load of the loads, the converter being configured to convert a higher voltage from the particular sector distribution bus to a lower voltage at an acceptable level for the particular load.

10. A method performed by a power distribution system comprising a plurality of sectors and a plurality of sector isolation switches, the method comprising:
 monitoring currents across each sector of the plurality of sectors, the sector comprising:
  a sector power source; and
  a sector distribution bus coupled to the sector power source, the sector distribution bus being configured to convey direct current (DC) power from the sector power source to one or more loads coupled to the sector distribution bus, the sector distribution bus being coupled to adjacent sector distribution buses through respective sector isolation switches of the plurality of sector isolation switches, the sector distribution buses of the plurality of sectors being coupled together to provide a DC power distribution bus;
 wherein:
  the sector power source for each sector uniquely corresponds to the sector distribution bus to which it is coupled and is not connected to the sector distribution bus thorough the sector isolation switches;
  for each sector of the plurality of sectors, the sector distribution bus of the sector is coupled to respective first and second sector isolation switches of the sector isolation switches, the first sector isolation switch is coupled to a first other sector distribution bus of a first other sector and the second sector isolation switch is coupled to a second other sector distribution bus of a second other sector, so that opening both the first and second sector isolation switches isolates the sector distribution bus from the DC power distribution bus;

the sector distribution bus of the sector is coupled to two adjacent sector distribution buses at two ends of the sector distribution bus through the first and second sector isolation switches for the sector distribution bus; and a number of the sector distribution buses is identical to a number of the sector isolation switches;

determining that a fault occurs at a first sector of the plurality of sectors; and in response to determining that the faults occurs at the first sector, opening respective sector isolation switches for the first sector distribution bus to isolate the first sector distribution bus from the DC power distribution bus, so that a particular load of the loads that is coupled to the first sector distribution bus and a second sector distribution bus of a second sector of the sectors draws power from the second sector distribution bus.

11. The method of claim 10, wherein the fault includes overcurrent, short circuit, or power outage, and determining that the fault occurs at the first sector comprises determining a current in the first sector is beyond a maximum threshold or below a minimum threshold.

12. The method of claim 10, wherein at least one sector power source of the plurality of sectors is coupled to a utility grid, and the at least one sector power source further comprises one or more backup generators for providing a total DC power substantially identical to a DC power provided by the at least one sector power source.

13. The method of claim 12, further comprising:
in response to determining that a fault occurs at a first sector of the plurality of sectors, turning on the one or more back-up generators.

14. The method of claim 10, wherein the particular load is coupled to each of the first and second sector distribution buses through a set of respective diodes.

15. The method of claim 14, further comprising a breaker coupled between the particular load and the respective diodes for the first and second sector distribution buses, the breaker being configured to perform operations comprising:
determining that a current to the particular load is beyond a predetermined threshold; and
in response to determining that the current to the load is beyond the predetermined threshold, isolating the load from the respective diodes and the first and second sector distribution buses.

16. The method of claim 15, wherein the first sector further comprises a converter coupled between the breaker and the particular load, the converter being configured to convert a higher voltage from the first sector distribution bus to a lower voltage at an acceptable level for the particular load.

\* \* \* \* \*